US010270808B1

(12) United States Patent
Sherif et al.

(10) Patent No.: US 10,270,808 B1
(45) Date of Patent: Apr. 23, 2019

(54) AUTO-GENERATED SYNTHETIC IDENTITIES FOR SIMULATING POPULATION DYNAMICS TO DETECT FRAUDULENT ACTIVITY

(71) Applicant: Capital One Services, LLC, McLean, VA (US)

(72) Inventors: Timur Sherif, Washington, DC (US); Hannes Jouhikainen, McLean, VA (US); Steve Blanchet, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/918,785

(22) Filed: Mar. 12, 2018

(51) Int. Cl.
| | |
|---|---|
| *H04L 29/06* | (2006.01) |
| *H04L 9/32* | (2006.01) |
| *G06Q 50/26* | (2012.01) |
| *G06F 21/00* | (2013.01) |
| *H04W 12/12* | (2009.01) |

(52) U.S. Cl.
CPC ....... *H04L 63/1491* (2013.01); *G06Q 50/265* (2013.01); *H04L 63/102* (2013.01); *H04W 12/12* (2013.01)

(58) Field of Classification Search
CPC ............. H04L 63/1491; H04L 63/1416; H04L 63/1466; H04L 63/102; H04L 63/126; H04L 2463/144; H04L 2463/146; H04L 67/02; G06F 21/554; G06F 2221/2123; G06Q 20/40; G06Q 50/265; H04W 12/12
See application file for complete search history.

(56) References Cited

U.S. PATENT DOCUMENTS

| | | | | |
|---|---|---|---|---|
| 5,422,468 A | * | 6/1995 | Abecassis | G06Q 20/00 235/375 |
| 6,715,672 B1 | * | 4/2004 | Tetro | G06Q 20/04 235/379 |
| 8,484,132 B1 | * | 7/2013 | Christiansen | G06Q 40/00 705/35 |
| 8,549,643 B1 | * | 10/2013 | Shou | G06F 21/556 455/410 |
| 8,826,400 B2 | * | 9/2014 | Amaya Calvo | H04L 63/1441 713/168 |

(Continued)

OTHER PUBLICATIONS

Virvilis, Nikos, Bart Vanautgaerden, and Oscar Serrano Serrano. "Changing The game: The art of deceiving sophisticated attackers." Cyber Conflict (CyCon 2014), 2014 6th International Conference On. IEEE, 2014. (Year: 2014).*

*Primary Examiner* — Michael Simitoski
(74) *Attorney, Agent, or Firm* — DLA Piper LLP US (57) ABSTRACT

Embodiments disclosed herein generally relate to a system and method for detecting fraudulent computer activity. A computing system generates a plurality of synthetic identities. Each of the plurality of synthetic identities mimics information associated with a verified identity. The computing system receives, from a user, an input attempt. The input attempt includes a synthetic identity of the plurality of synthetic identities. The computing system compares input information in the input attempt to the plurality of synthetic identities. The computing system determines that the input information in the input attempt includes information from the plurality of synthetic identities, if it does, the computing system rejects the input attempt.

19 Claims, 7 Drawing Sheets

(56) References Cited

U.S. PATENT DOCUMENTS

| | | | | |
|---|---|---|---|---|
| 8,880,435 B1* | 11/2014 | Catlett | G06Q 20/10 | 705/75 |
| 9,009,829 B2* | 4/2015 | Stolfo | G06F 21/554 | 726/23 |
| 9,439,070 B2* | 9/2016 | Sugiyama | H04W 12/12 | |
| 9,590,969 B2* | 3/2017 | Reno | H04L 63/08 | |
| 9,912,695 B1* | 3/2018 | Chao | H04L 63/1491 | |
| 9,917,858 B2* | 3/2018 | Hathaway | H04L 63/1433 | |
| 2002/0055995 A1* | 5/2002 | Beckwith | H04Q 3/0029 | 709/223 |
| 2004/0153663 A1* | 8/2004 | Clark | G06Q 30/0185 | 726/25 |
| 2005/0060263 A1* | 3/2005 | Golan | G06O 20/02 | 705/44 |
| 2005/0086161 A1* | 4/2005 | Gallant | G06Q 10/107 | 705/39 |
| 2006/0271457 A1* | 11/2006 | Romain | G06Q 20/04 | 705/35 |
| 2008/0052359 A1* | 2/2008 | Golan | G06Q 10/107 | 709/206 |
| 2009/0241191 A1* | 9/2009 | Keromytis | H04L 63/145 | 726/23 |
| 2009/0328216 A1* | 12/2009 | Rafalovich | H04L 43/0876 | 726/23 |
| 2010/0077483 A1* | 3/2010 | Stolfo | G06F 21/554 | 726/24 |
| 2010/0235623 A1* | 9/2010 | Simpson | G06F 21/40 | 713/155 |
| 2011/0047593 A1* | 2/2011 | Ausems | G06Q 20/0453 | 726/1 |
| 2011/0167494 A1* | 7/2011 | Bowen | G06F 21/566 | 726/24 |
| 2012/0084866 A1* | 4/2012 | Stolfo | G06F 21/554 | 726/25 |
| 2012/0123942 A1* | 5/2012 | Song | G06Q 20/40 | 705/44 |
| 2013/0212658 A1* | 8/2013 | Amaya Calvo | H04L 63/1441 | 726/6 |
| 2013/0263226 A1* | 10/2013 | Sudia | H04L 63/1466 | 726/4 |
| 2013/0346311 A1* | 12/2013 | Boding | G06Q 20/3227 | 705/44 |
| 2014/0041024 A1* | 2/2014 | Larkins | G06F 21/554 | 726/22 |
| 2015/0150110 A1* | 5/2015 | Canning | H04L 63/0807 | 726/9 |
| 2015/0310201 A1* | 10/2015 | Sugiyama | H04W 12/12 | 726/7 |
| 2015/0326588 A1* | 11/2015 | Vissamsetty | H04L 63/1491 | 726/23 |
| 2016/0134658 A1* | 5/2016 | Akiyama | G06F 21/55 | 726/23 |
| 2016/0359876 A1* | 12/2016 | Touboul | G06F 21/577 | |
| 2016/0373447 A1* | 12/2016 | Akiyama | H04L 63/1416 | |
| 2017/0161520 A1* | 6/2017 | Lockhart, III | H04L 63/08 | |
| 2017/0180347 A1* | 6/2017 | Koved | H04L 63/083 | |
| 2017/0195346 A1* | 7/2017 | Be'Ery | H04L 63/1416 | |
| 2017/0230384 A1* | 8/2017 | Touboul | H04L 63/1416 | |
| 2017/0289191 A1* | 10/2017 | Thioux | H04L 63/1441 | |
| 2017/0324773 A1* | 11/2017 | Ohayon | H04L 63/10 | |
| 2017/0337556 A1* | 11/2017 | Kohli | G06Q 20/3674 | |
| 2018/0007066 A1* | 1/2018 | Goutal | H04L 63/1416 | |
| 2018/0103061 A1* | 4/2018 | Allen | H04L 63/1491 | |

* cited by examiner

AUTO-GENERATED SYNTHETIC IDENTITIES FOR SIMULATING POPULATION DYNAMICS TO DETECT FRAUDULENT ACTIVITY

FIELD OF THE DISCLOSURE

The present disclosure generally relates to a method and a system for detecting fraudulent computer activity.

BACKGROUND

Businesses, such as financial institutions, are susceptible to users attempting fraudulent identification attempts. For example, an individual may misrepresent information on an application for a financial account, such as a credit card application, to fraudulently obtain a financial product (e.g., a credit card). Once obtained, the individual may use the financial product to purchase goods and/services without intending to pay the financial institution providing the product. In some examples, an individual may attempt to impersonate individuals, based on the individual's personal information on various websites hosted on the darkweb, for example. Thus, in addition to defrauding the financial institutions, these individuals further defraud the individual underlying the personal information.

SUMMARY

Embodiments disclosed herein generally relate to a system and method for detecting fraudulent computer activity. In one embodiment, a method is disclosed herein. A computing system generates a plurality of synthetic identities. Each of the plurality of synthetic identities mimics information associated with a verified identity. The computing system uploads the plurality of synthetic identities to a darkweb accessible web page. The computing system receives, from a user, an input attempt. The input attempt includes a synthetic identity of the plurality of synthetic identities. The computing system compares input information in the input attempt to the plurality of synthetic identities. The computing system determines that the input information in the input attempt includes information from the plurality of synthetic identities. The computing system rejects the input attempt.

In some embodiments, the computing system further identifies a digital footprint of the user attempting to use the information. A digital footprint may include an Internet protocol (IP) address of the user attempting to use information from the plurality of synthetic identities. The computing system identifies a further input attempt originating from the IP address. The computing system blocks the further input attempt.

In some embodiments, the further input attempt includes further input information that corresponds to a verified identity.

In some embodiments, the further input attempt includes further input information that contains information from the plurality of synthetic identities.

In some embodiments, generating the plurality of synthetic identities includes the computing system generating a set of synthetic identification information. The set of synthetic identification information includes at least one of a name, date of birth, social security number, bank account number, address, and telephone number. A synthetic identity may be identified based on a unique synthetic identifier, such as, for example, a synthetic social security number, and/or a synthetic identity may be identified based on a unique synthetic combination of information (the individual pieces of which may not necessarily be unique).

In some embodiments, uploading the plurality of synthetic identities to a darkweb accessible web page includes the computing system injecting the plurality of synthetic identities in the darkweb accessible webpage such that the plurality of synthetic identities are comingled with a plurality of verified identities on the darkweb accessible web page.

In some embodiments, generating the plurality of synthetic identities includes the computing system referencing a candidate synthetic identity against one or more credit reporting agencies to verify that the candidate synthetic identity does not correspond to a verified identity. The computing system determines that the synthetic identity does not correspond to a verified identity. The computing system converts the candidate synthetic identity to a synthetic identity of the plurality of synthetic identities.

In some embodiments, the computing system further monitors a computing system from which the input attempt originates, by tacking its IP address or other aspects of a digital footprint.

In some embodiments, the computing system further identifies a footprint of the input attempt. The computing system references the footprint in analysis of further input attempts.

In another embodiment, a system is disclosed herein. The system includes a processor and a memory. The memory has programming instructions stored thereon, which, when executed by the processor, performs an operation. The operation includes comparing a set of personal information of a first transaction attempt, wherein the first transaction attempt includes an attempt to open an account using the set of personal information, to a plurality of synthetic identities that were generated to mimic information used to open an account with an application. The operation further includes determining that the set of personal information includes information from the plurality of synthetic identities. The operation further includes rejecting the transaction attempt.

In some embodiments the plurality of synthetic identities are hosted on a darkweb accessible web page.

In some embodiments, the operation further includes identifying an Internet protocol (IP) address of a computing system attempting to use the information from the plurality of synthetic identities. The operation further includes identifying a further transaction attempt originating from the IP address. The operation further includes blocking the further transaction attempt.

In some embodiments, the further transaction attempt includes further a further set of personal information that corresponds to a pre-existing account of the application.

In some embodiments, the further transaction attempt includes a further set of personal information that includes information from the plurality of synthetic identities.

In some embodiments, the plurality of synthetic identities includes a set of synthetic identification information that includes at least one of a name, date of birth, social security number, bank account number, address, and telephone number.

In some embodiments, the operation of comparing the set of personal information of the transaction attempt to the plurality of synthetic identities includes the operation of comparing the set of personal information of the transaction attempt on a text field by text field basis.

In some embodiments, the operation further includes monitoring a computing system from which the input attempt originates by tracking its IP address.

In some embodiments, the operation further includes identifying a footprint of the input attempt and referencing the footprint in analysis of further input attempts.

In another embodiment, a method is disclosed herein. A computing system receives an input attempt from a user operating a client device. The computing system extracts from the input attempt a set of identification information. The computing system transmits, from the client device to a remote server, the set of identification information. The computing system receives an indication from the remote server that the input attempt includes information associated with a synthetic identity. The input attempt may include synthetic identification information posted to a darkweb accessible web page. The computing system updates an interface of the client device to notify the user that remote server confirmed the input attempt to involve a stolen identity.

In some embodiments, the computing system further receives a further input attempt from a user operating the client device. The computing system extracts from the further input attempt a further set of input information. The computing system transmits the further set of input information to the remote server. The computing system receives an indication from the remote server that the input attempt is transmitted from a flagged IP address. The computing system updates the interface of the client device to notify the user that remote server confirmed the input attempt to involve a stolen identity.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to a method and a system for detecting fraudulent computer access. One or more techniques disclosed herein relate to identifying a fraudulent attempt of a user mimicking an identity. For example, businesses, and more particularly financial institutions, have become more reliant on online forms for credit card application, loan application, money transfers, and the like. In some embodiments, filling out these online forms may include information as basic as name, date of birth, and social security number. Hackers may attempt to steal a person's identities from an institution, or may access such stolen information from other sources, (e.g., on the darkweb), and then use the identities to access accounts, apply for credit, steal money, and the like. The techniques discussed below provide solutions aimed at detecting improper use of identities to reduce the likelihood of hackers or fraudsters leveraging stolen identification information for such illegal purposes.

In some embodiments, the techniques disclose herein generate a plurality of synthetic identities that mimic actual identities such that their synthetic nature may not be readily apparent to a fraudster or hacker. The generated synthetic identities, however, include indicia or combinations of indicia that enable detection of the use of such synthetic identities (or aspects thereof). In some embodiments, a generated synthetic identity may be injected into the darkweb. In some embodiments, the synthetic identities may be injected in the darkweb on pages that hackers are more likely to frequent. The synthetic identities may be comingled with verified identities to further mask the process. In some embodiments, a generated synthetic identity may be included among valid data, e.g. within an enterprise's legitimate databases etc.

The techniques discussed herein for generating a synthetic identity may be based on information sourced from public sources, e.g. the Internet, or the darkweb or other illegitimate data sources, from which characteristics of identification information including characteristics of stolen identification information may be determined. In some embodiments, characteristics of identification information may be determined based on legitimate or originating sources (e.g. enterprise information, or credit bureau data) to determine characteristics of verified identities and unverified identities alike. The disclosed techniques leverage the identified characteristics to generate synthetic identities.

In some embodiments, the disclosed techniques compare incoming input attempts (e.g., credit card application, loan application, bank withdrawal, etc.) to a database of identity information. The database may include the synthetic identities. The comparison with synthetic identities may be part of the same process or a separate process for validating the incoming input attempts. If there is a match between information in the incoming input attempts and the synthetic identities, then this corresponds to an attempt by a user to defraud a synthetic individual. In further embodiments, the present techniques may also identify an Internet protocol (IP) address (or other indicia indicative of a digital footprint) of the input attempt, as a further check in identifying whether the input attempt is a valid input attempt or a fraudulent input attempt.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
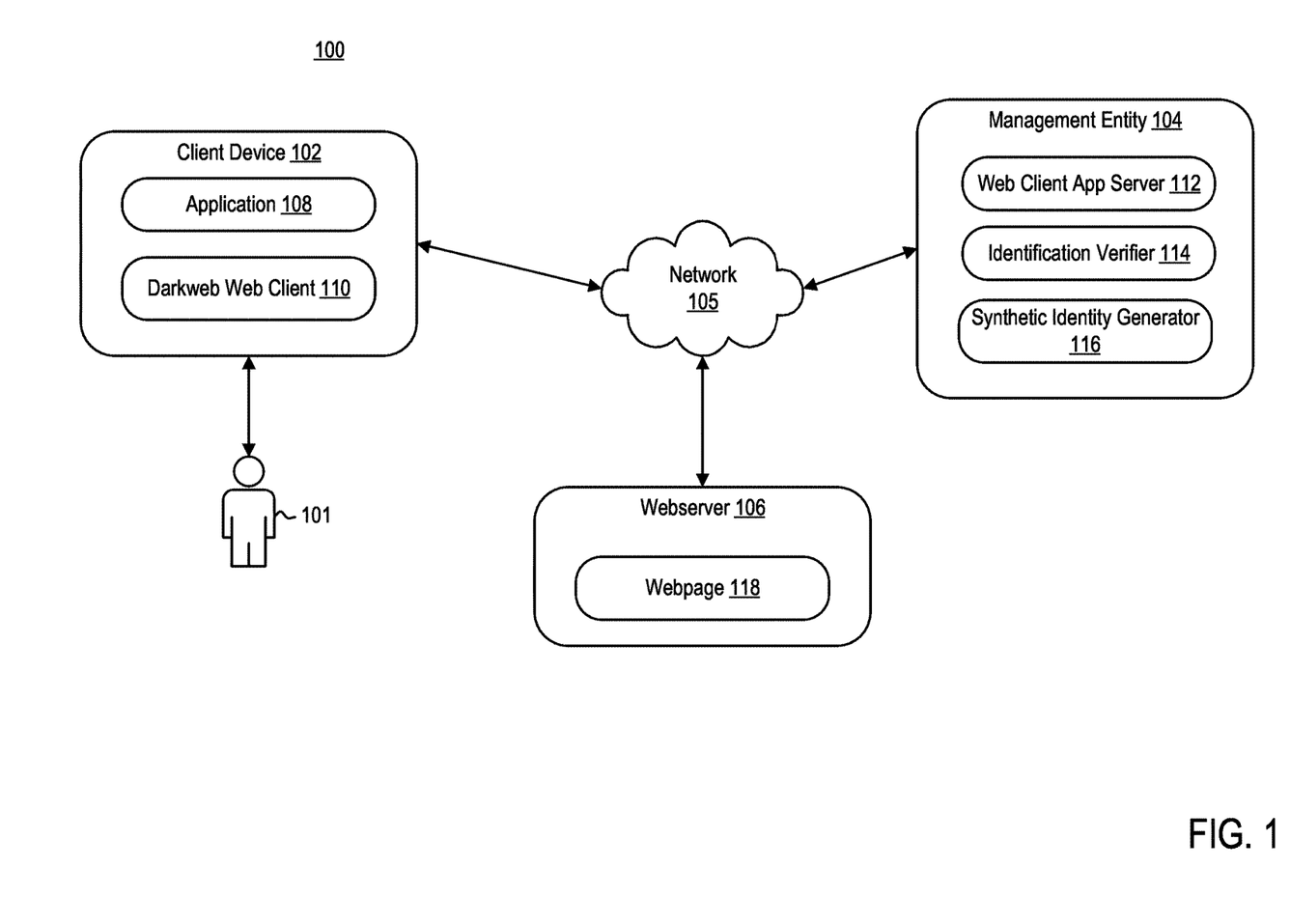
FIG. 1 is a block diagram illustrating a computing environment, according to one embodiment.

FIG. 1 is a block diagram illustrating a computing environment 100, according to one embodiment. Computing environment 100 includes a client device 102, a webserver 106, and a management entity 104. Client device 102, management entity 104, and webserver 106 may be in communication over network 105. Client device 102 may be operated by user 101. For example, client device 102 may be a mobile device, a tablet, a desktop computer, or any computing system having the capabilities described herein.

Client device 102 includes at least an application 108. In some embodiments, client device 102 may include a darkweb web client 110. Application 108 may be representative of a web browser that allows access to a website or a stand-alone application. User 101 may operate client device 102 to access a functionality of management entity 104 using application 108. In the embodiments described below, user 101 operating client device 102 may communicate over network 105 to request a webpage, for example, from web client application server 112. For example, client device 102 may be configured to execute application 108 to access content managed by web client application server 112. The content that is displayed to the user may be transmitted from web client application server 112 to client device 102, and subsequently processed by application 108 for display through a graphical user interface (GUI) of client device 102. For embodiments disclosed herein, user 101 may operate client device 102 to access a functionality of management entity using application 108, such that user may attempt to impersonate a synthetic identity or an authentic identity. A synthetic identity is a non-authentic identity that was generated to mimic an authentic identity (or verified identity). In the disclosed embodiments, a synthetic identity is not necessarily intended to mimic any particular authentic identity, rather the information, the combination of information, etc., is intended to be indistinguishable (e.g. not readily distinguishable to an illicit holder) from authentic identities generally.

Darkweb web client 110 may be representative of a web browser that allows access to World Wide Web content on darkweb or overlay networks that use the Internet but require specific software, configurations, or authorization for access. An example of a darkweb web client 110 is The Onion Router (Tor). User 101 may operate client device 102 to access a functionality of webserver 106 using darkweb web client 110. In the embodiments described below, user 101 operating client device 102 may communicate over network 105 to request a darkweb webpage, for example, from webserver 106. For example, webserver 106 hosts webpage 118, which is a darkweb accessible webpage. In the embodiments discussed below, webpage 118 may host a plurality of identifying information that may include a plurality of synthetic identities and a plurality of authentic identities.

In some embodiments disclosed herein, user 101 may refer to a user that is accessing identification information for illegal, illegitimate, or fraudulent purposes. For example, user 101 may access webpage 118 in hopes to obtain verified (i.e., authentic) identification information of various persons. In some embodiments, user 101 may use such information for purposes such as, but not limited to, credit card applications, loan application, bank account login information, credit account login information, online transactions, and the like. The methods and systems disclosed herein aid in identifying and/or detecting those individuals, such as user 101, whose intentions are to impersonate individuals for illegal purposes. In the disclosed embodiments, user 101 may access identification information in any number of ways not limited to the darkweb. In some embodiments, user 101 may steal or otherwise obtain identification information from legitimate sources.

Management entity 104 may further include identification verifier 114 and synthetic identity generator 116. Synthetic identity generator 116 is configured to generate one or more synthetic (i.e., non-authentic) identities. The one or more synthetic identities may be posted on one or more darkweb websites (e.g., webpage 118), or otherwise made accessible to potential fraudsters. In some embodiments, the synthetic identities may be provided among authentic identities in legitimate data (e.g. to detect illicit access to legitimate data). In some embodiments, synthetic identity generator 116 may be configured to generate fake identities in a form or format that is similar to a format of verified identities posted on the darkweb. In some embodiments, synthetic identity generator 116 applies a machine learning method to look through various sources of verified identification information (e.g. credit bureau data or enterprise data) or from identity information on the Internet, as well as the darkweb, to generate the one or more synthetic identities. The machine learning model may be configured to generate a synthetic identity that sufficiently mimics a verified identity and that is also sufficiently distinct from any verified identities such that use of one or more pieces of information contained in the synthetic identity may be readily detectable by identification verifier 114.

In some embodiments, this process may involve scouring various sources or websites to gather information to determine what an example "verified" identity looks like (e.g., name, date of birth, social security number, bank account information, address, etc.) and compile and/or create new, synthetic identities. The synthetic identities may be created from existing information as well as newly created information. In some embodiments, the generated synthetic identities may include indicia or combinations of indicia that enable detection of the use of such synthetic identities (or aspects thereof). For example, a synthetic identity may be identified based on a unique synthetic identifier, such as, for example, a synthetic social security number, and/or a synthetic identity may be identified based on a unique combination of information (the individual pieces of which may not necessarily be synthetic or unique).

Identification verifier 114 is configured to determine whether received identification information is authentic and/or to detect receipt of information associated with a synthetic identity. For example, identification verifier 114 is configured to decipher between synthetic identification information and authentic identification information. In the disclosed embodiments, the generated synthetic identification information is generated to be sufficiently distinct such that use of one or more pieces of information contained therein may be readily detectable by identification verifier 114. In other words, identification verifier 114 is configured to determine whether the received identification information is an authentic attempt or is an attempt trying to impersonate another individual, whether a verified individual or a synthetic individual. Although identification verifier 114 is shown in conjunction with management entity 104, identification verifier 114 may be hosted on various third party computing systems. Accordingly, in some embodiments, even though various third party computing systems did not generate the one or more synthetic identities (i.e., do not include synthetic identity generator 116), those skilled in the art would readily understand that such third party computing systems may include identification verifier 114 to detect fraudulent computer activity using the operations discussed below.

Figure 2:
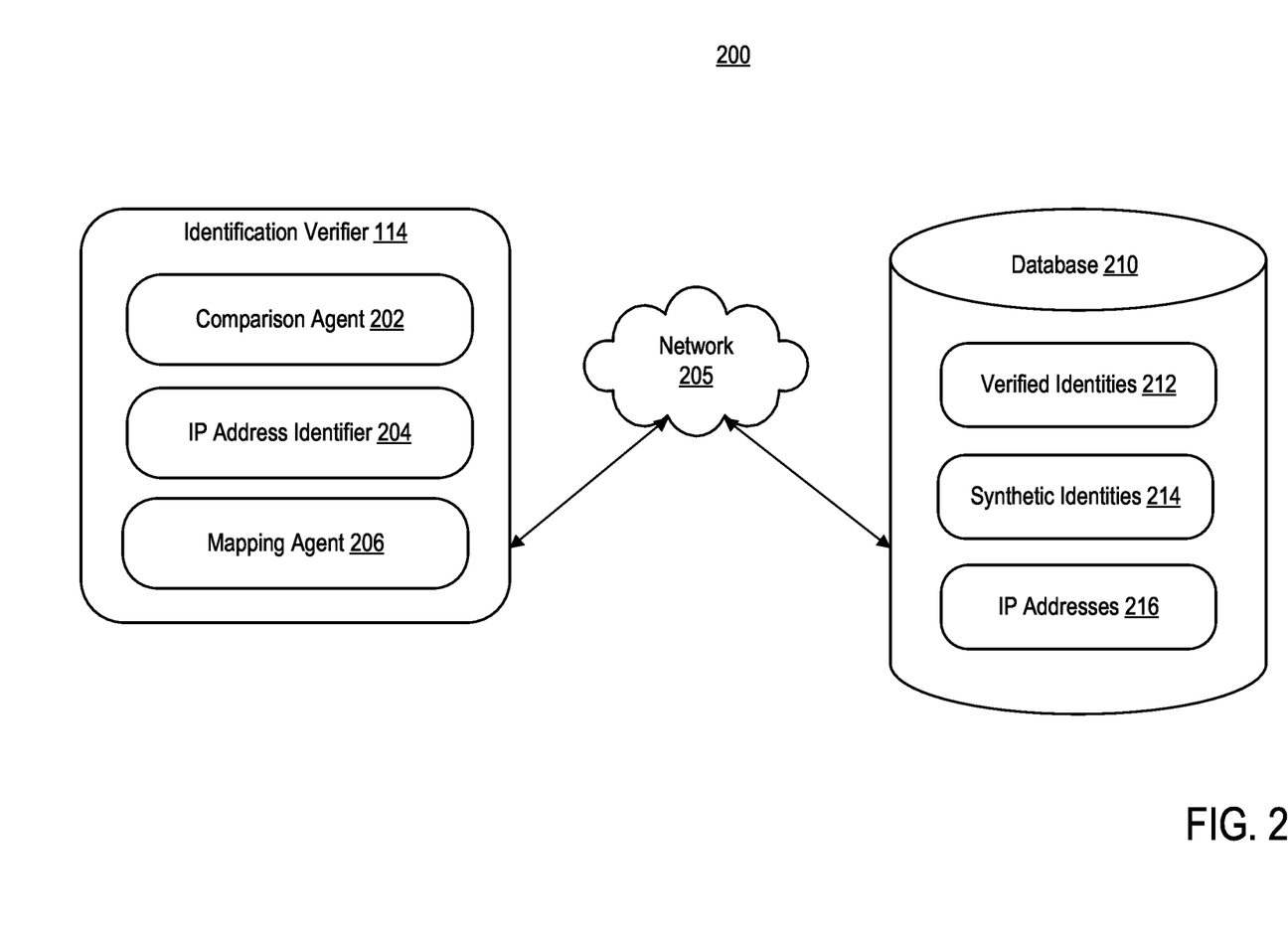
FIG. 2 is a block diagram illustrating components of the computing environment of FIG. 1 in more detail, according to one embodiment.

FIG. 2 is a block diagram 200 illustrating components of computing environment 100 in more detail, according to one embodiment. As illustrated, identification verifier 114 is in communication with database 210 via network 205. Identification verifier 114 is configured to determine whether identification information entered by client device 102 is associated with an authentic identity or a synthetic identity. Further, in some embodiments, if identification verifier 114 determines that user 101 has entered information directed to an authentic identity, identification verifier 114 is further configured to determine whether user 101 is attempting to impersonate an individual using the authentic identity information.

Identification verifier 114 may include a comparison agent 202, an Internet protocol (IP) address identifier 204, and a mapping agent 206. Each of comparison agent 202, IP address identifier 204, and mapping agent 206 may be comprised of one or more software modules. The one or more software modules are collections of code or instructions stored on a media (e.g., memory of management entity 104) that represent a series of machine instructions (e.g., program code) that implements one or more algorithmic steps. Such machine instructions may be the actual computer code the processor of management entity 104 interprets to implement the instructions, or, alternatively, may be a higher level coding of the instructions that is interpreted to obtain the actual computer code. The one or more software modules may also include one or more hardware components. One or more aspects of an example algorithm may be performed by the hardware components (e.g., circuitry) itself, rather as a result of an instruction.

Comparison agent 202 is configured to compare received identification information to existing identification information. In some embodiments, the existing identification information may be stored in database 210. Database 210 may generally include one or more verified identification information 212 (i.e., verified identities), one or more synthetic identification information 214 (i.e., synthetic identities), and one or more Internet protocol (IP) addresses 216. One or more verified identification information 212 may include identification information of individuals having accounts accessible via application 108. In some embodiments, one or more verified identification information 212 may include information accessible from one or more credit bureau databases. In some embodiments, database 210 may be associated with one or more credit bureaus. One or more synthetic identification information 214 may include identification information that was generated by management entity 114. For example, management entity 114 may generate one or more synthetic identification information, which does not correspond to authentic information of any individual. In some embodiments, the generated synthetic identification information may include indicia or information or combinations of information that enable detection of the use of such synthetic identities (or aspects thereof). In the disclosed embodiments, the generated synthetic identification information is generated to be sufficiently distinct such that use of one or more pieces of information contained therein may be readily detectable by identification verifier 114. One or more IP addresses 216 may include the IP address (as well as other information indicative of a digital footprint) of computing systems that were previously identified to be submitting synthetic identification information as input information. Digital footprint information may be generalized to any information transmitted from client device 102. For example, digital footprint information may include the IP address, online profiles associated with the user, messages transmitted by the user, posts submitted by the user, information submitted via fillable fields of an online form, and the like.

When user 101 submits identification information to management entity 104 via application 108 (for example), comparison agent 202 compares the identification information to the existing identification information in database 210. For example, comparison agent 202 may query database 210 to determine if there is a match between the received identification information and identification information, whether verified or synthetic.

IP address identifier 204 is configured to identify an IP address (or digital footprint generally) of a machine submitting the identification information. For example, IP address identifier 204 may be configured to identify IP address of client device 102 of user 101, when user 101 submits identification information. Identifying IP address of client device 102 aids in further analysis. For example, in some embodiments, a user 101 may submit a plurality of sets of identification information from client device 102. A portion of the sets of identification information may be authentic information that user 101 obtained from a darkweb accessible website or a legitimate source. A portion of the sets of identification information may be synthetic information that user 101 obtained from a darkweb accessible website or that was comingled with legitimate data in a legitimate source. In some embodiments, the authentic information and the synthetic information obtained by user 101 was obtained from the same darkweb accessible webpage or the same legitimate source. In these embodiments, tracking the IP address (and/or digital footprint generally) of user 101 may aid in detecting attempts where authentic information is being used to impersonate real identities.

Mapping agent 206 is configured to map received identification information to at least one of a set of verified identification information 212 or a set of synthetic identification information 214. For example, mapping agent 206 may map the received identification information by querying database 210 to determine if there is a match between at least a portion of the received identification information and at least a portion of a set of verified identification information or a set of synthetic identification information 214. In some embodiments, mapping agent 206 may query database 210 searching for an exact match between the received identification information and a set of verified identification information 212 or a set of synthetic identification information 214.

Figure 3:
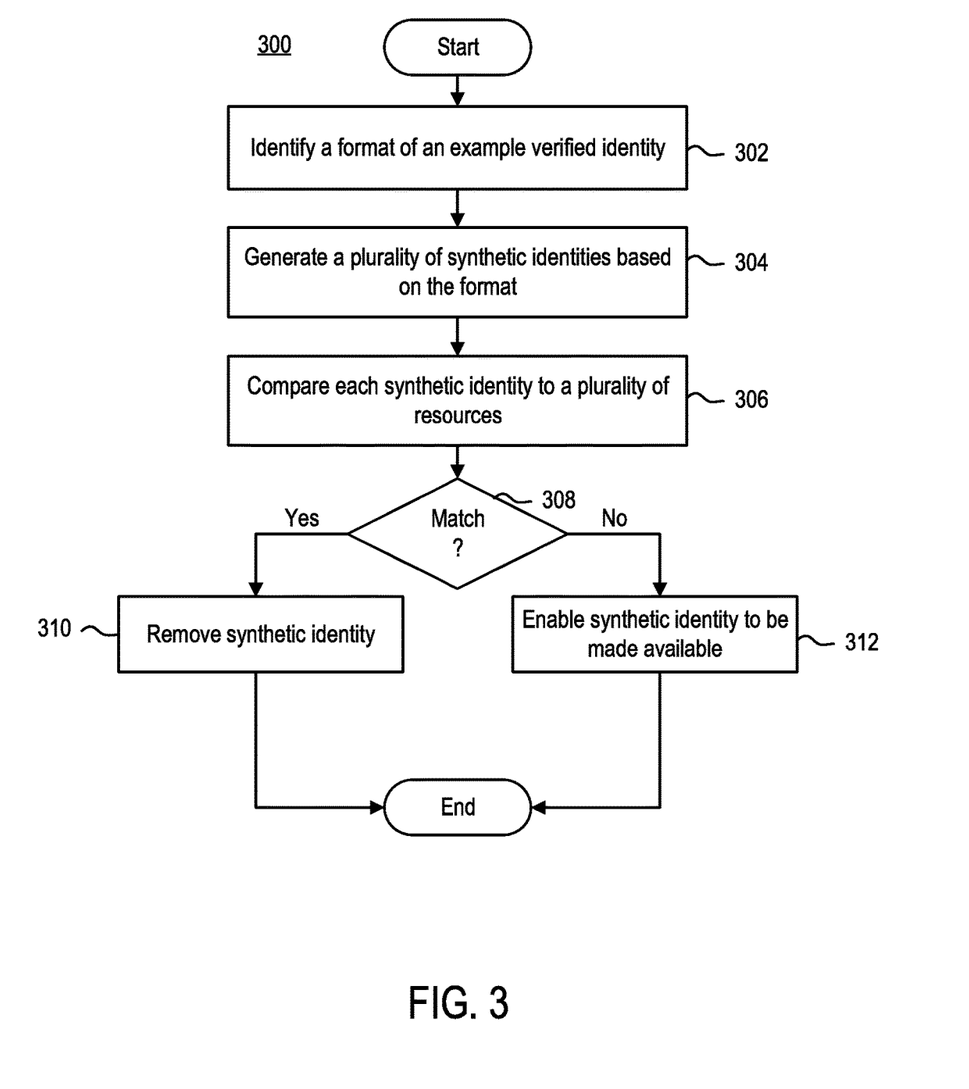
FIG. 3 is a flow diagram illustrating a method of generating one or more synthetic identities, according to one embodiment.

FIG. 3 is a flow diagram of a method 300 of generating one or more sets of synthetic identification information, according to an embodiment. One or more sets of synthetic identification information may be generated for posting onto a darkweb accessible website, such as webpage 118, for example, or otherwise made accessible. When one or more sets of synthetic information are posted or otherwise made accessible, one or more sets of synthetic information may be co-mingled with one or more sets of verified identification information, such that one or more sets of synthetic information appears authentic to users. In some embodiments, one or more sets of synthetic identification information may also be intermingled with legitimate data. In some embodiments, the placement and/or manner in which a synthetic identity is made accessible, may be tracked so as to detect the manner in which a synthetic identity is obtained and/or to detect an information breach, for example, such as when the synthetic identification information is placed in a legitimate (e.g. presumably secure) source.

Method 300 begins at step 302. At step 302, synthetic identity generator 116 may determine what an example "verified" identity looks like. For example, synthetic identity generator 116 may scour one or more resources or websites to identify a format of an example verified identity. The pattern may include information such as, but not limited to, name, date of birth, social security number, bank account information, address, telephone number, e-mail address, and the like. In some embodiments, synthetic identity generator 116 may scour one or more databases and websites—both the darkweb and the Clearnet (i.e., the non-darkweb).

At step 304, synthetic identity generator 116 may generate a plurality of sets of synthetic identification information based, in part, on the identified format. Each of the one or more sets of synthetic information may be created from existing information, as well as newly created information. Each set of synthetic identification information may include, for example, at least one or more of a name, a date of birth, a social security number, a bank account information, an address, a user identification (user ID) and a password. In some embodiments, the synthetic identification information may include indicia or combinations of indicia that enable detection of the use of such synthetic identities (or aspects thereof). For example, a synthetic identity may be identified based on a unique synthetic identifier, such as, for example, a synthetic social security number, and/or a synthetic identity may be identified based on a unique combination of information. Accordingly, synthetic information may be generated in such a way as to be detectable by identification verifier 114 or flagged by a credit bureau, and, at the same time, indistinguishable to a hacker from verified identities.

At step 306, synthetic identity generator 116 compares each set of synthetic identification information to one or more resources. For example, synthetic identity generator 116 may compare each set of synthetic identification information to one or more identification verification databases, various credit bureau websites, various background search websites, various person look-up websites, and the like. Comparing each set of synthetic identification to one or more identification verification databases aids in reducing the possibility of a set of synthetic identification information matches an identity of a verified person.

At step 308, synthetic identity generator 116 determines whether there is a match between a generated set of synthetic identification information and an authentic identity from an identification verification database. In some embodiments, synthetic identity generator 116 determines if a match exists if a predetermined number of identification fields match an individual authentic identity. In some embodiments, synthetic identity generator 116 determines if a match exists if all identification fields in the synthetic identification information matches all identification fields in an authentic identity.

If at step 308, synthetic identity generator 116 determines that there is a match between the generated set of synthetic identification information and an authentic identity, then at step 310, synthetic identity generator removes the set of synthetic identification information. Thus, synthetic identity generator 116 reduces the likelihood that actual identification information is leaked.

If, however, at step 308, synthetic identity generator 116 determines that there is not a match between the generated set of synthetic identification information and an authentic identity, then at step 312, synthetic identity generator 116 enables the synthetic identity to be made available. In some embodiments, synthetic identity generator 116 may post the set of synthetic identification information to webpage 118. By posting the sets of synthetic identification information to various webpages on the darkweb (e.g., webpage 118), synthetic identity generator 116 may be able to detect access points where fraudsters may access the synthetic data. In some embodiments, synthetic identity generator 116 may add synthetic identity to database 210.

Figure 4:
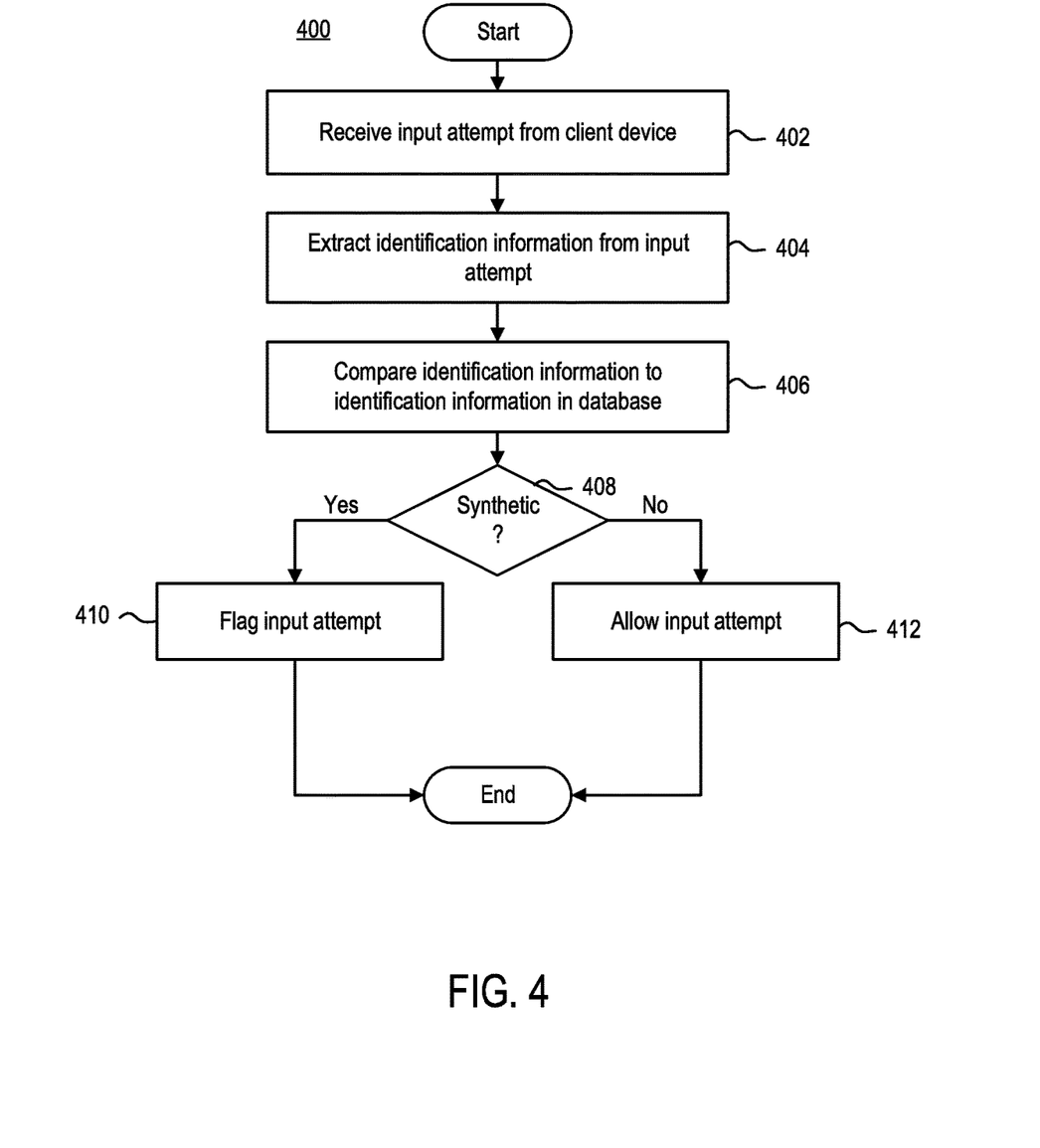
FIG. 4 is a flow diagram illustrating a method of detecting fraudulent computer activity, according to one embodiment.

FIG. 4 is a flow diagram of a method 400 of detecting fraudulent computer activity, according to one embodiment. Although method 400 is discussed in conjunction with the components discussed above in conjunction with FIGS. 1 and 2, those skilled in the art could readily understand that the following method may be performed by any suitable computing system. Further, although the operations below are performed in conjunction with the identification verifier 114 of management entity 104, the operations may be performed by identification verifier 114 hosted on various third party computing systems. Accordingly, in some embodiments, even though various third party computing systems did not generate the one or more synthetic identities, those skilled in the art would readily understand that such third party computing systems may include identification verifier 114 to detect fraudulent computer activity using the operations discussed below.

Method 400 begins at step 402. At step 402, management entity 402 receives an identification input from client device 102. For example, management entity 402 may receive identification input from client device 102 via application 108 on client device 102. The identification input generally includes identifying information that can uniquely identify an individual (e.g., name, date of birth, social security number, bank account information, address, user ID, password, personal identification number (PIN), and the like). In some embodiments, the identification information may be submitted in a fillable form displayed via application 108. For example, the form may be for a credit card application, a loan application, a bank transfer information, and the like. In some embodiments, the identification information may be submitted via a login screen to a user's bank account, credit card account, and the like.

At step 404, identification verifier 114 extracts identification information from the identification input. In some embodiments, identification verifier 114 may extract identification information from fillable fields in the received form. In some embodiments, identification verifier may extract identification information by scraping an uploaded document.

At step 406, identification verifier 114 compares the extracted identification information from the identification input to database 210. For example, identification verifier 114 may query database 210 with the extracted identification information. In some embodiments, identification verifier 114 may query database 210 with the extracted identification information to determine an exact match. In some embodiments, identification verifier 114 may query database 210 with the extracted identification information to determine whether a portion of the extracted identification information matches a portion of a set of identification information in database 210.

At step 408, identification verifier 114 determines whether the extracted identification information matches a set of synthetic identification information. Determining whether the extracted identification information matches a set of synthetic identification information may be indicative of a fraudulent attempt to impersonate a synthetically created identity. In some embodiments, identification verifier 114 is able to determine that the extracted identification information matches a set of synthetic identification information by restricting the query to synthetic identification information 214.

If, at step 408, identification verifier 114 determines that the extracted identification information matches a set of synthetic identification information, then at step 410, identification verifier 114 may flag the user's attempt. In some embodiments, flagging the user's attempt includes mimicking a verification screen, such that user is provided with information that may lead user to believe that the input was accepted. In some embodiments, flagging the user's attempt includes recording an IP address of the machine from which the input information originated, as well as other information associated with a digital footprint of the attempt. In some embodiments, recording the IP address of the machine includes identifying a footprint of the input attempt. For example, identifying the footprint of the attempt may include identifying one or more unique characteristics of the input attempt. In some embodiments, a footprint may include a digital signature implemented by the user, a time of day the user transmits input information, a number of simultaneous input transmissions, a particular website from which the user retrieved the synthetic identification information, and the like.

If, however, at step 408, identification verifier 114 determines that the extracted identification information does not match a set of synthetic identification information, then at step 412, identification verifier may allow the input attempt. For example, identification verifier 114 may determine that the extracted identification matches a set of verified identification information. In another example, identification verifier 114 may determine that the extracted identification information does not match a verified identification information, and is a new input attempt. In some embodiments, one or more intermediate steps (e.g., credit check via credit bureau) may be performed before allowing the input attempt.

In some embodiments, a portion of method 400 may be performed at a client device 102 side. For example, in some embodiments, client device 102 may parse through the received identification input and extract the identification information. Client device 102 may then transmit the extracted identification information to management entity 104 for further analysis. Based on the response from management entity 104, client device 102 may update a graphical user interface (GUI) of client device 102 to notify user 101 that the attempt was rejected or accepted.

In some embodiments, however, it may not be sufficient to determine whether the received input attempt matches a set of synthetic identification information. For example, a compromised or flagged computing device may submit information directed to a set of verified identification information, thereby attempting to impersonate the individual.

Figure 5:
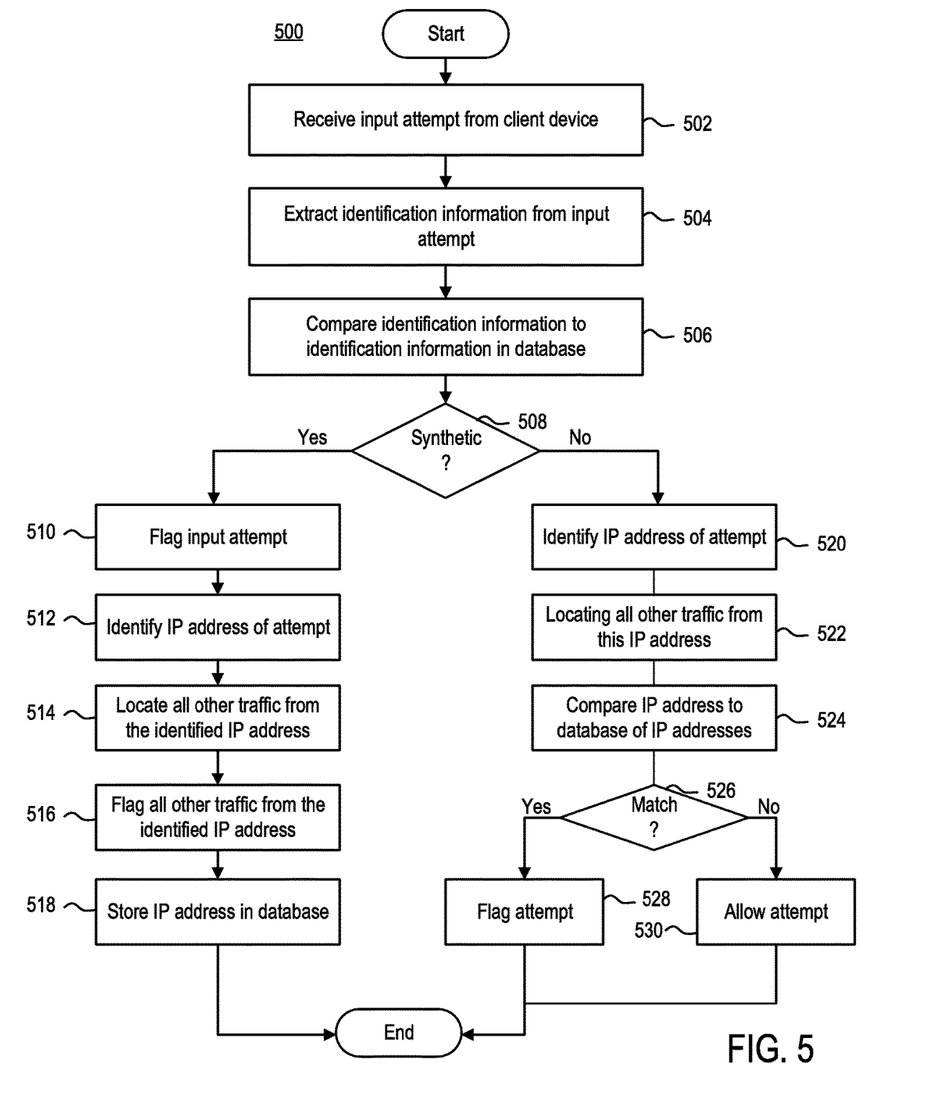
FIG. 5 is a flow diagram illustrating a method of detecting fraudulent computer activity, according to one embodiment.

FIG. 5 is a flow diagram of a method 500 for detecting fraudulent computer activity, according to an example embodiment. Aspects of method 500 (e.g., steps 502, 504, 506 and 508) are substantially similar to method 400. Although method 500 is discussed in conjunction with the components discussed above in conjunction with FIGS. 1 and 2, those skilled in the art could readily understand that the following method may be performed by any suitable computing system. Further, although the operations below are performed in conjunction with the identification verifier 114 of management entity 104, the operations may be performed by identification verifier 114 hosted on various third party computing systems. Accordingly, in some embodiments, even though various third party computing systems did not generate the one or more synthetic identities, those skilled in the art would readily understand that such third party computing systems may include identification verifier 114 to detect fraudulent computer activity using the operations discussed below.

Method 500 begins at step 502. At step 502, management entity 104 receives an identification input from client device 102. For example, management entity 104 may receive identification input from client device 102 via application 108 on client device 102. The identification input generally includes identifying information that can uniquely identify an individual (e.g., name, date of birth, social security number, bank account information, address, user ID, password, personal identification number (PIN), and the like).

At step 504, identification verifier 114 extracts identification information from the identification input. In some embodiments, identification verifier 114 may extract identification information from fillable fields in the received form. In some embodiments, identification verifier may extract identification information by scraping an uploaded document.

At step 506, identification verifier 114 compares the extracted identification information from the identification input to database 210. For example, identification verifier 114 may query database 210 with the extracted identification information. In some embodiments, identification verifier 114 may query database 210 with the extracted identification information to determine an exact match. In some embodiments, identification verifier 114 may query database 210 with the extracted identification information to determine whether a portion of the extracted identification information matches a portion of a set of identification information in database 210.

At step 508, identification verifier 114 determines whether the extracted identification information matches a set of synthetic identification information. Determining whether the extracted identification information matches a set of synthetic identification information may be indicative of a fraudulent attempt to impersonate a synthetically created identity. In some embodiments, identification verifier 114 is able to determine that the extracted identification information matches a set of synthetic identification information by restricting the query to synthetic identification information 214.

If, at step 508, identification verifier 114 determines that the extracted identification information matches a set of synthetic identification information, then at step 510, identification verifier 114 may flag the user's attempt. In some embodiments, flagging the user's attempt includes mimicking a verification screen, such that user is provided with information that may lead user to believe that the input was accepted. In some embodiments, flagging the user's attempt includes recording an IP address of the machine from which the input information originated, as well as other information associated with a digital footprint of the attempt. In some embodiments, recording the IP address of the machine includes identifying a footprint of the input attempt. For example, identifying the footprint of the attempt may include identifying one or more unique characteristics of the input attempt. In some embodiments, a footprint may include a digital signature implemented by the user, a time of day the user transmits input information, a number of simultaneous input transmissions, a particular website from which the user retrieved the synthetic identification information, and the like.

At step 512, identification verifier 114 identifies an IP address of the computing device (e.g., client device 102) from which the input attempt originates. Identifying the IP address of the computing device from which the input attempt originates aids in more quickly identifying subsequent, simultaneous, or near-simultaneous additional input attempts originating from the same IP address. As recited above, the sets of synthetic identification information may be co-mingled with verified identification information. Therefore, a user with access to the sets of synthetic identification information may also have access to sets of verified identification information.

At step 514, identification verifier 114 locates other incoming traffic from the identified IP address. For example, as an additional verification step, identification verifier 114 may query for an IP address of machines from which input attempts originate to a current identified IP address as well as a database of previously flagged IP addresses.

At step 516, identification verifier 114 flags all other attempts originating from a machine having the same IP address. In some embodiments, flagging the user's attempt includes mimicking a verification screen, such that user is provided with information that may lead user to believe that the input was accepted.

At step 518, identification verifier stores the identified IP address in database 210. Although the storing step is illustrated in step 518 after steps 514 and 516, those skilled in the art could readily understand that storing of the IP address may be performed simultaneously or after step 512, and before at least one of steps 514 and 516.

If, however, at step 508, identification verifier 114 determines that the extracted identification information does not match a set of synthetic identification information, then at step 520, identification verifier 114 identifies an IP address of the computing device (e.g., client device 102) from which the input attempt originates. Identifying the IP address of the computing device from which the input attempt originate aids in more quickly and identifying subsequent, simultaneous, or near-simultaneous additional input attempts originating from the same IP address. As recited above, the sets of synthetic identification information may be co-mingled with verified identification information. Therefore, a user with access to the sets of synthetic identification information may also have access to sets of verified identification information.

At step 522, identification verifier 114 locates other incoming traffic from the identified IP address. For example, as an additional verification step, identification verifier 114 may query for an IP address of machines from which input attempts originate to a current identified IP address as well as a database of previously flagged IP addresses.

At step 524, identification verifier 114 compares the identified IP address to a database of IP addresses. For example, identification verifier 114 may query database 210 to determine if the identified IP address matches a previously flagged and stored IP address.

At step 524, identification verifier 114 determines if there is a match between the currently identified IP address and an IP address in database 210. If at step 524, if identification verifier 114 determines that there is a match, then at step 528, identification verifier 114 flags the attempt. In some embodiments, flagging the user's attempt includes mimicking a verification screen, such that user is provided with information that may lead user to believe that the input was accepted.

If, however, at step 524, identification verifier 114 determines that there is not a match, then at step 530, identification verifier 114 may allow the input attempt.

Figure 6:
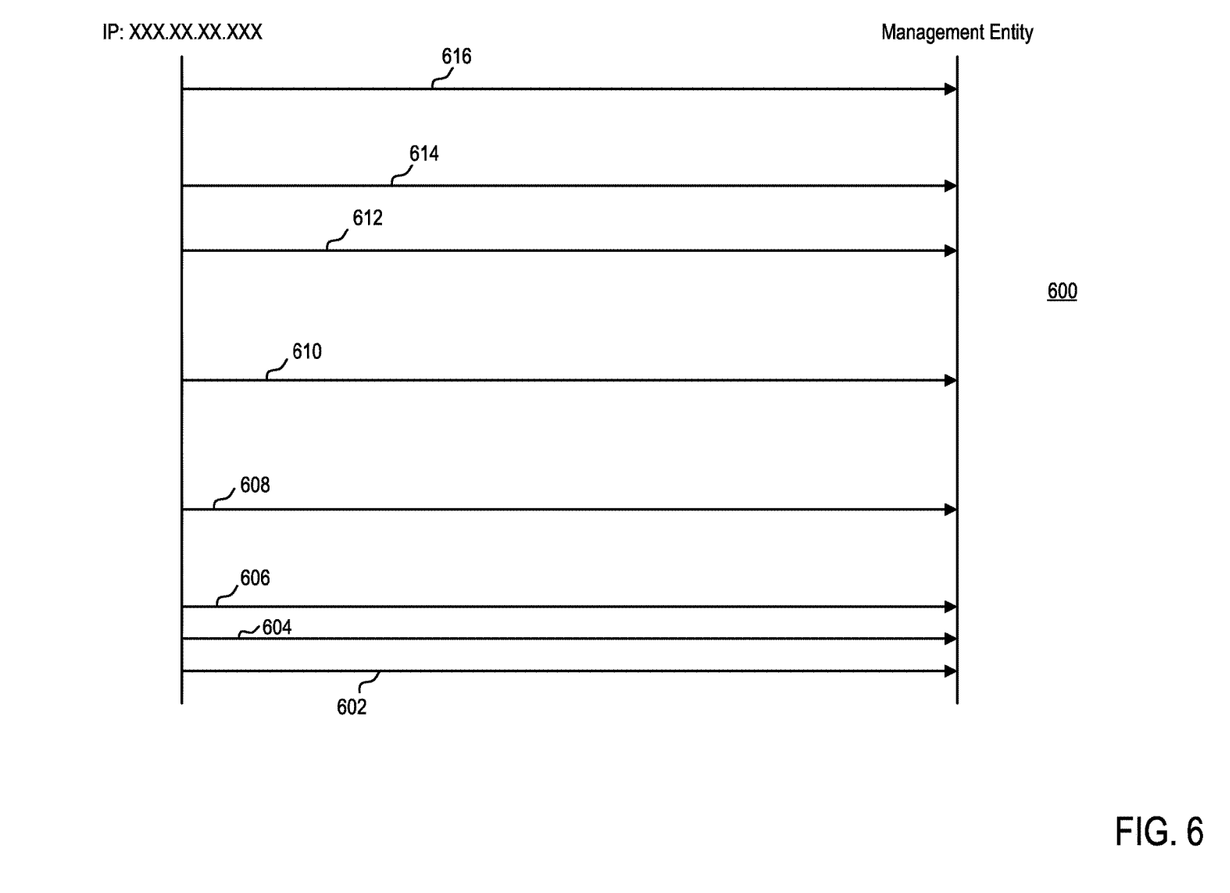
FIG. 6 is block diagram illustrating example impersonation attempts, according to one embodiment.

FIG. 6 is a block diagram 600 visually depicting a plurality of input attempts originating from a same computing system, according to one embodiment. As illustrated, input attempts 602-616 originate from a computing device having IP address XXX.XX.XX.XXX. Of input attempts 602-616, in this embodiment, only input attempts 602 and 604 include information from the one or more sets of synthetic identification information. Input attempt 606 includes information from the one or more sets of verified identification information. Input attempts 608-616 include identification information not stored in database 210. Merely relying on a match between the input information and the one or more sets of synthetic identification information would allow input attempts 606-616 to pass through identification verifier 114. However, because identification verifier 114 also records the IP address of the machine (i.e. computing system) from which an improper input attempt originates, identification verifier 114 is able to flag each of verification attempts 608-616.

Figure 7:
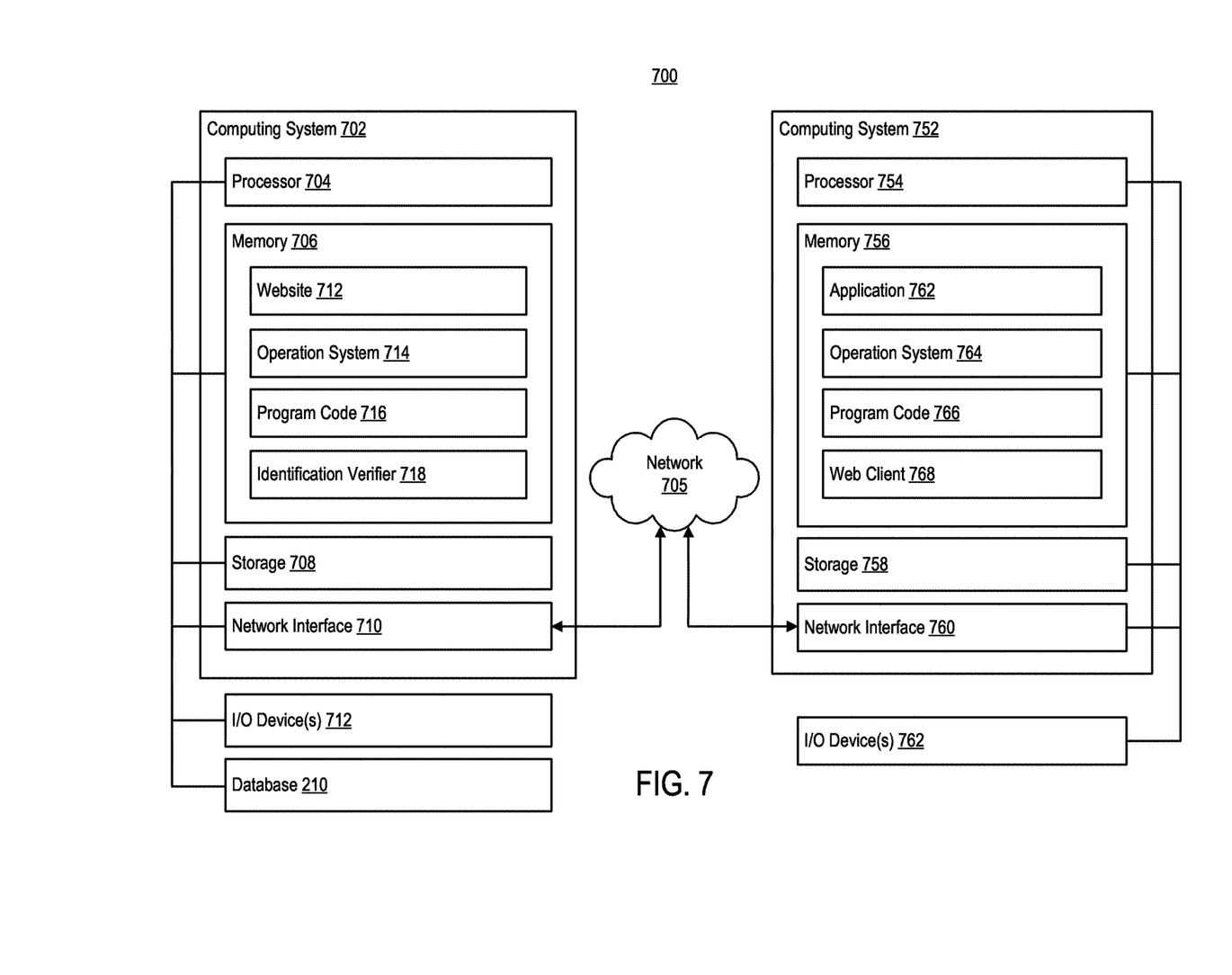
FIG. 7 is a block diagram illustrating a computing environment, according to one embodiment.

FIG. 7 is a block diagram illustrating a computing environment 700, according to one embodiment. Computing environment 700 includes computing system 702 and computing system 752 communicating over network 705. Computing system 702 may be representative of management entity 104. Computing system 752 may be representative of client device 102.

Computing system 702 may include a processor 704, a memory 706, a storage 708, and a network interface 710. In some embodiments, computing system 700 may be coupled to one or more I/O device(s) 712. In some embodiments, computing system 700 may be in communication with database 210.

Processor 704 retrieves and executes program code 716 (i.e., programming instructions) stored in memory 706, as well as stores and retrieves application data. Processor 704 is included to be representative of a single processor, multiple processors, a single processor having multiple processing cores, and the like. Network interface 710 may be any type of network communications enabling computing system 702 to communicate externally via computing network 705. For example, network interface 710 allows computing system 700 to communicate with computer system 752.

Storage 708 may be, for example, a disk storage device. Although shown as a single unit, storage 708 may be a combination of fixed and/or removable storage devices, such as fixed disk drives, removable memory cards, optical storage, network attached storage (NAS), storage area network (SAN), and the like.

Memory 706 may include website 712, operating system 714, program code 716, and identification verifier 718. Program code 716 may be accessed by processor 704 for processing (i.e., executing program instructions). Program code 716 may include, for example, executable instructions configured to perform steps discussed above in conjunction with FIGS. 3-5. As an example, processor 704 may access program code 716 to perform operations for determining validity of an input attempt. In another example, processor 704 may access program code 716 to perform operations for generating one or more sets of synthetic identification information. Website 712 may be accessed by computing system 752. For example, website 712 may include content accessed by computing system 752 via a web browser or application.

Identification verifier 718 may be a software module corresponding to identification verifier 114 in FIG. 1. Identification verifier 718 is configured to determine whether received identification information is authentic. For example, identification verifier 114 is configured to decipher between the synthetic identification information and authentic identification information. In other words, identification verifier 114 is configured to determine whether the received identification information is an authentic attempt or is an attempt trying to impersonate another individual, whether a verified individual or a synthetic individual. Although illustrated as a software module (i.e. identification verifier 718), identification verifier 114 may include one or more hardware components working in conjunction with software module.

Computing system 752 may include a processor 754, a memory 756, a storage 758, and a network interface 760. In some embodiments, computing system 752 may be coupled to one or more I/O device(s) 762.

Processor 754 retrieves and executes program code 766 (i.e., programming instructions) stored in memory 756, as well as stores and retrieves application data. Processor 754 is included to be representative of a single processor, multiple processors, a single processor having multiple processing cores, and the like. Network interface 760 may be any type of network communications allowing computing system 752 to communicate externally via computing network 705. For example, network interface 760 is configured to enable external communication with computing system 702.

Storage 708 may be, for example, a disk storage device. Although shown as a single unit, storage 708 may be a combination of fixed and/or removable storage devices, such as fixed disk drives, removable memory cards, optical storage, network attached storage (NAS), storage area network (SAN), and the like.

Memory 756 may include application 762, operating system 764, program code 766, and web client 768. Program code 766 may be accessed by processor 754 for processing (i.e., executing program instructions). Program code 716 may include, for example, executable instructions for communicating with computing system 702 to display one or more pages of website 712. Application 762 enables a user of computing system 752 to access a functionality of computing system 702. For example, application 762 may access content managed by computing system 702, such as website 712. The content that is displayed to a user of computing system 752 may be transmitted from computing system 702 to computing system 752, and subsequently processed by application 762 for display through a graphical user interface (GUI) of computing system 752. Web client 768 enables a user of computing system 752 to access a functionality of a webserver hosting a darkweb accessible website.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method, comprising:
generating a plurality of synthetic identities by applying a machine learning model utilizing sources of verified information, such that the plurality of synthetic identities mimics information associated with a verified identity, the generating comprising:
referencing a generated candidate synthetic identity against one or more credit reporting agencies to verify that the candidate synthetic identity does not correspond to a verified identity;
determining that the candidate synthetic identity does not correspond to a verified identity; and
converting the candidate synthetic identity to a synthetic identity of the plurality of synthetic identities;
uploading the plurality of synthetic identities to a darkweb accessible web page;
receiving, from a user, an input attempt comprising input information associated with a synthetic identity of the plurality of synthetic identities;
comparing the input information in the input attempt to the plurality of synthetic identities;
determining that the input information in the input attempt comprises information from the plurality of synthetic identities; and
rejecting the input attempt.

2. The method of claim 1, further comprising:
identifying an Internet protocol (IP) address of the user attempting to use information from the plurality of synthetic identities;
identifying a further input attempt originating from the IP address; and
blocking the further input attempt.

3. The method of claim 2, wherein the further input attempt comprises further input information that corresponds to a verified identity.

4. The method of claim 2, wherein the further input attempt comprises further input information that contains information from the plurality of synthetic identities.

5. The method of claim 1, wherein generating the plurality of synthetic identities comprises:
generating a set of synthetic identification information that comprises at least one of a name, date of birth, social security number, bank account number, address, and telephone number.

6. The method of claim 1, wherein uploading the plurality of synthetic identities to a darkweb accessible web page comprises:

injecting the plurality of synthetic identities in the darkweb accessible webpage such that the plurality of synthetic identities is comingled with a plurality of verified identities on the darkweb accessible web page.

7. The method of claim 1, further comprising:
monitoring a computing system from which the input attempt originates, by tracking its IP address.

8. The method of claim 1, further comprising:
identifying a footprint of the input attempt; and
referencing the footprint in analysis of further input attempts.

9. A system, comprising:
a processor; and
a memory having programming instructions stored thereon, which, when executed by the processor, performs an operation comprising:
generating a plurality of synthetic identities by applying a machine learning model utilizing sources of verified information, such that the plurality of synthetic identities mimics information associated with a verified identity, the generating comprising:
referencing a generated candidate synthetic identity against one or more credit reporting agencies to verify that the candidate synthetic identity does not correspond to a verified identity;
determining that the candidate synthetic identity does not correspond to a verified identity; and
converting the candidate synthetic identity to a synthetic identity of the plurality of synthetic identities;
comparing a set of personal information of a first transaction attempt, wherein the first transaction attempt comprises an attempt to open an account using the set of personal information, to the plurality of synthetic identities;
determining that the set of personal information comprises information from the plurality of synthetic identities; and
rejecting the transaction attempt.

10. The system of claim 9, wherein the plurality of synthetic identities are hosted on a darkweb accessible web page.

11. The system of claim 9, wherein the operation further comprises:
identifying an Internet protocol (IP) address of a computing system attempting to use the information from the plurality of synthetic identities;
identifying a further transaction attempt originating from the IP address; and
blocking the further transaction attempt.

12. The system of claim 11, wherein the further transaction attempt comprises a further set of personal information that corresponds to a pre-existing account of the application.

13. The system of claim 11, wherein the further transaction attempt comprises a further set of personal information that comprises information from the plurality of synthetic identities.

14. The system of claim 9, wherein each of the plurality of synthetic identities comprises:
a set of synthetic identification information that comprises at least one of a name, date of birth, social security number, bank account number, address, and telephone number.

15. The system of claim 9, wherein comparing the set of personal information of the transaction attempt to the plurality of synthetic identities comprises:
comparing the set of personal information of the transaction attempt on a text field by text field basis.

16. The system of claim 9, the operation further comprising:
monitoring a computing system from which the input attempt originates, by tracking its IP address.

17. The system of claim 9, the operation further comprising:
identifying a footprint of the input attempt; and
referencing the footprint in analysis of further input attempts.

18. A non-transitory computer readable medium including one or more sequences of instructions which, when executed by one or more processors, cause the one or more processors to perform operations, comprising:
generating a plurality of synthetic identities by applying a machine learning model utilizing sources of verified information, such that the plurality of synthetic identities mimics information associated with a verified identity, the generating comprising:
referencing a generated candidate synthetic identity against one or more credit reporting agencies to verify that the candidate synthetic identity does not correspond to a verified identity;
determining that the candidate synthetic identity does not correspond to a verified identity; and
converting the candidate synthetic identity to a synthetic identity of the plurality of synthetic identities;
uploading the plurality of synthetic identities to a darkweb accessible web page;
receiving, from a user, an input attempt comprising input information associated with a synthetic identity of the plurality of synthetic identities;
comparing the input information in the input attempt to the plurality of synthetic identities;
determining that the input information in the input attempt comprises information from the plurality of synthetic identities; and
rejecting the input attempt.

19. The non-transitory computer readable medium of claim 18, wherein the operations further comprise:
identifying an Internet protocol (IP) address of the user attempting to use information from the plurality of synthetic identities;
identifying a further input attempt originating from the IP address; and
blocking the further input attempt.

* * * * *